United States Patent [19]
Kahle et al.

[11] 3,880,954
[45] Apr. 29, 1975

[54] METHOXY SILANE COUPLING OF BLOCK COPOLYMER FORMED IN CYCLOHEXANE

[75] Inventors: Gerald R. Kahle, Brussels, Belgium; Alonzo G. Kitchen; Carl A. Uraneck, both of Bartlesville, Okla.

[73] Assignee: Phillips Petroleum Company, Bartlesville, Okla.

[22] Filed: Aug. 22, 1973

[21] Appl. No.: 390,405

[52] U.S. Cl. ........... 260/879; 260/85.1; 260/94.7 A
[51] Int. Cl. .............................................. C08d 5/04
[58] Field of Search .......... 260/879, 94.7 A, 94.9 F, 260/85.1

[56]     References Cited
         UNITED STATES PATENTS

| 3,281,335 | 10/1966 | Wentz et al. | 260/94.7 X |
|---|---|---|---|
| 3,281,383 | 10/1966 | Zeliniski et al. | 260/94.7 X |
| 3,499,878 | 3/1970 | Wood | 260/94.9 F X |
| 3,639,517 | 2/1972 | Kitchen et al. | 260/879 |
| 3,692,874 | 9/1972 | Farrar et al. | 94/7 X |

*Primary Examiner*—William F. Hamrock

[57]            ABSTRACT

Lithium-initiated resinous block copolymer chains are coupled utilizing a methoxy silane coupling agent. Thereafter the mixture is treated with water. The methyl alcohol thus formed is separated and the cyclohexane recycled.

7 Claims, 1 Drawing Figure

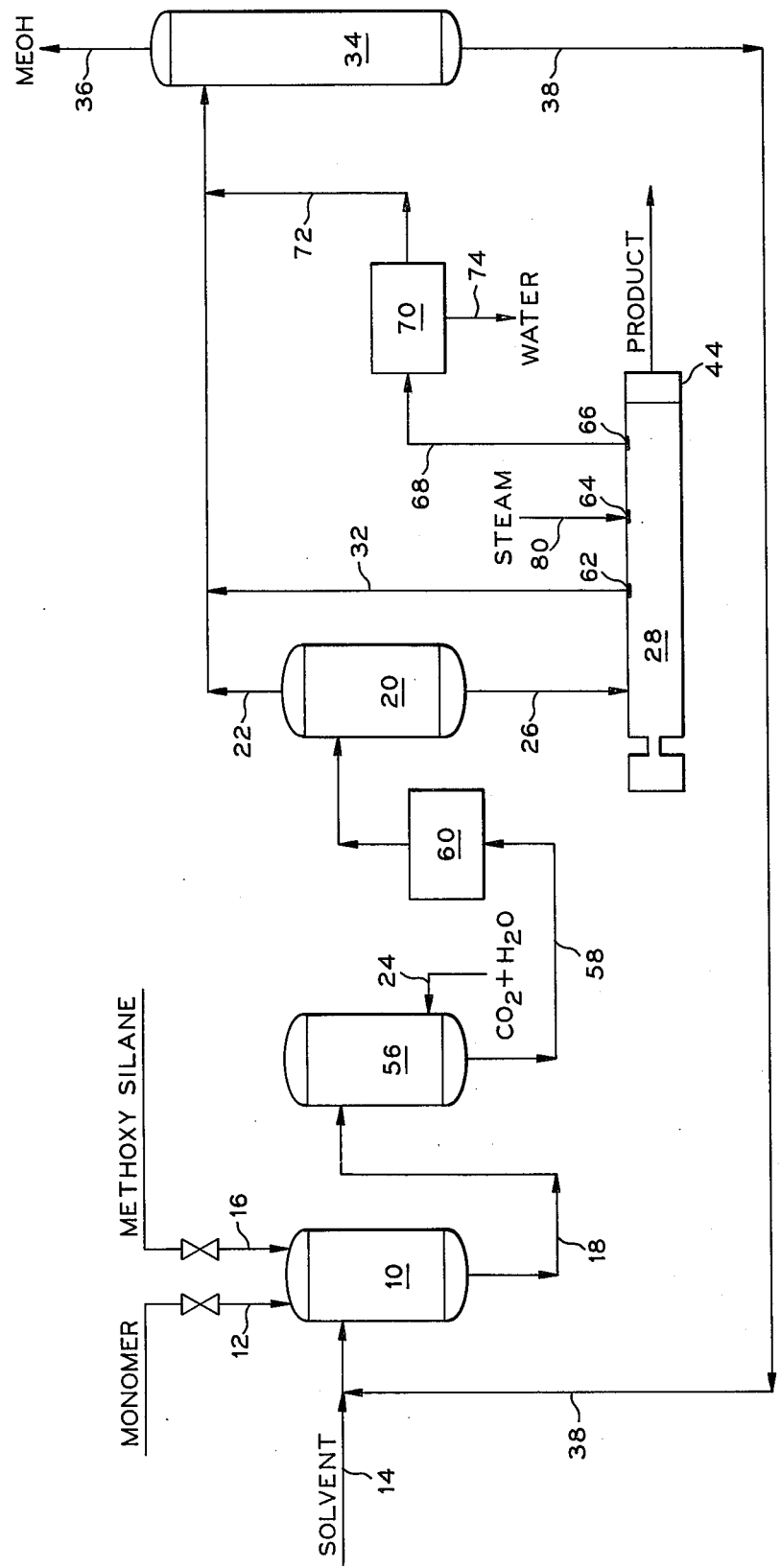

METHOXY SILANE COUPLING OF BLOCK COPOLYMER FORMED IN CYCLOHEXANE

BACKGROUND OF THE INVENTION

This invention relates to forming block copolymers by coupling lithium-initiated polymer chains formed in the presence of a cyclohexane solvent wherein the resulting polymer is treated with water and the cyclohexane recycled.

It is broadly known to react couling agents with lithium-initiated polymer as exemplified by Zelinski et al, U.S. Pat. No. 3,244,664 and Zelinski et al, U.S. Pat. No. 3,281,383. Applying this technology to resinous block copolymers it is possible to simulate the properties of impact polystyrene. Such polymers have been found to offer, in addition to high impact strength, far greater clarity than is obtained when impact polystyrene is produced by blending separate rubber and resinous materials. Kitchen et al, U.S. Pat. No. 3,639,517, describes high impact low haze copolymers.

After the coupling operation, polymer is generally contacted with water either as a result of a carbon dioxide and water treatment to reduce color, or as a result of utilizing steam in a down-stream finishing operation, or both. This produces a by-product which is an alcohol corresponding to the alkyl group on the coupling agent. Since alcohols act as catalyst poisons this by-product must be removed before recycling the cyclohexane solvent.

SUMMARY OF THE INVENTION

It is an object of this invention to permit recycle of solvent in the production of block copolymers; and it is yet a further object of this invention to produce resinous block copolymers having good color and low haze.

In accordance with this invention lithium-initiated block copolymer prepared in the presence of cyclohexane is treated with a silane having at least two methoxy groups, the resulting polymer contacted with water, the resulting methyl alcohol separated, the cyclohexane recycled and the copolymer recovered.

BRIEF DESCRIPTION OF THE DRAWING

The drawing is a schematic representation showing apparatus suitable for carrying out the invention.

DESCRIPTION OF THE PREFERRED EMBODIMENTS

The polymerization initiators employed in the process of this invention are well known and can be broadly depicted as organolithium initiators. Those preferred are hydrocarbyl monolithium compounds and can be represented by the formula RLi where R is a hydrocarbon radical selected from aliphatic, cycloaliphatic, or aromatic radicals containing from about 1 to 20 carbon atoms per molecule. Exemplary initiators suitable for use in the process in this invention include: n-butyllithium, sec-butyllithium, methyllithium, phenyllithium, naphthyllithium, p-tolyllithium, cyclohexyllithium, eiocosyllithium, and the like, n-butyllithium being the preferred initiator. The initiator is first contacted with the monovinyl-substituted aromatic hydrocarbon monomer or mixtures thereof. Suitable monovinyl-substituted aromatic hydrocarbon monomers employed to produce the block copolymer chains are those containing 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl) styrene, 1-vinylnaphthalene, 2-vinylnaphthalene, and the like, styrene being preferred. The monovinyl-substituted aromatic hydrocarbon monomer can be added in a single increment or in multiple increments as disclosed in said Kitchen et al. patent, the disclosure of which is hereby incorporated by reference.

A conjugated diene is then contacted with the polymer chains formed in the initial reaction. Conjugated dienes or mixtures thereof that can be employed include those having 4–12 carbon atoms per molecule, those containing 4–8 carbon atoms being preferred. Exemplary of suitable compounds are 1,3-butadiene, isoprene, 2,3-dimethyl-1,3-butadiene, piperylene, 3-butyl-1, 3-octadiene, phenyl-1,3-butadiene, and the like, 1,3-butadiene being particularly preferred. Small amounts of an ether compound, such as tetrahydrofuran, can also be employed in the polymerization reaction. Amounts of tetrahydrofuran can range from about 0.005 to 5 weight percent based on the total monomer charge and more preferably about 0.05 to 0.1 weight percent. The tetrahydrofuran appears to reduce the induction period of some of the initiators, such as n-butyllithium.

The terminal non-elastomeric segments of the block copolymer chain (the monovinyl-substituted aromatic component) comprise 70–95, preferably 75–85 weight percent of the total weight of the block copolymer with the elastomeric segments (the diene component) comprising 30–5, preferably 25–15 weight percent of the total weight of the block copolymer based on the weight of all of the polymerized monomers incorporated. On coupling, the final product is resinous. The word "resinous" is used in its conventional sense to denote a normally solid material not having elastic properties. Generally such material will have a Shore D hardness (ASTM D 1706–61) and greater than 62, preferably greater than 69.

The coupling agent can be any silane having at least two, preferably at least three methoxy groups. The other group or groups must be methoxy, hydrogen or a 1–6 carbon atom alkyl group. The preferred material is methyltrimethoxy silane.

The solvent must be cyclohexane in order for the predominantly resinous material to be sufficiently soluble.

Preferably the polymerization reaction is carried out under conditions of relatively high solids in the polymerization zone. The solid content can vary from 15 to 40, preferably 30 to 35 weight percent based on the total weight of the solids and solvent.

The resulting coupled polymer is contacted with water either as a result of a carbon dioxide and water treatment to improve color and haze or as a result of contact with steam or water in a finishing operation or both. Preferably the polymerization mixture after the coupling is treated with carbon dioxide and water while still in the reaction zone. Preferably the carbon dioxide and water will be added in approximately the theoretical amount necessary to react with the lithium. Of course, this can vary some, with a range of 0.8 to 2 times the stoichometric amount of carbon dioxide in water generally being used. Preferably at least a stoichometric amount of carbon dioxide based on lithium is used. Also the ratio of water to carbon dioxide, while preferably on an equal molar basis, can also vary from 0.5 to 100, preferably 0.5 to 10 mols of water per mol of carbon dioxide. If anything, a slight excess of water is preferred.

The treating time will generally be in the range of 0.01 to 100, preferably 1 to 10 minutes. Actually the time is more a function of mixing efficiency with the reaction being essentially instantaneous after contact; however, continued contact does not seem to harm the process. It is believed the alcohol formed as a result of the contact with water results from the reactions as depicted in the following equation where P represents the block polymer chain

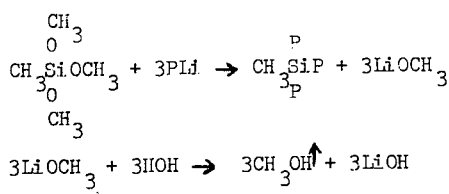

Before recycling the solvent, it is passed to a zone where the methyl alcohol is separated therefrom since alcohols are catalyst poisons. This can conveniently be done in a distillation column since the alcohol will come off the top of the column along with a small amount of cyclohexane in view of the fact that methyl alcohol and cyclohexane form an azetrope having a minimum boiling point of 54.2°C. The material at the bottom of the column will be pure cyclohexane.

Other silane coupling agents would be less suitable; for instance isobutyoxy silane would form isobutyl alcohol which forms an azetrope boiling at 78° which would be difficult to separate frm the cyclohexane which boils at 81°C. The normal butyl alcohol-cyclohexane azetrope boils at 79.8°C which would also be very difficult to separate.

Referring now to the drawing forming a part hereof, there is shown a polymerization zone 10 containing solvent and tetrahydrofuran. Styrene is initially introduced into this reactor via line 12 and after polymerization thereof through contact with an n-butyllithium initiator, butadiene is added. Make-up solvent is introduced via line 14. After the reaction is complete trimethoxymethyl silane is added via line 16 to couple the block copolymer chains to give a radial block copolymer having three chains radiating from a central nucleus each chain having a central elastomeric segment and a terminal non-elastomeric segment. The resulting coupled polymer is then withdrawn via line 18 and passed to blowdown tank 56 where carbon dioxide and water are introduced via line 24. After the carbon dioxide and water have been mixed with the coupled polymer the thus treated polymer solution is withdrawn via line 58 and passed to heat exchanger 60 where the solution is heated to about 270°–300°F and then to flash tank 20 where the solids content of the solution is increased from about 30 weight percent to about 36 weight percent by flashing solvent off via line 22. The polymer solution is then withdrawn via line 26 and passed to devolatilizating extruder 28. Much of the solvent and most of the methanol and remaining water are taken off at port 62 via line 32 and passed to line 22 and then to column 34 for separation of methanol and any water which may be present from the bulk of the cyclohexane, which cyclohexane is recycled via line 38 to line 14. Steam or water is introduced into extruder 28 via line 80 to port 64 where it contacts the polymer melt still containing some solvent. The remaining solvent and steam are removed from the extruder at port 66 via line 68 to phase separator 70. Wet cyclohexane is passed via line 72 to line 22 for recovery in column 34. Water is withdrawn from the separator via line 74 for recovery or discarded. The resulting product is removed from the extruder via die 44.

CALCULATED ILLUSTRATIVE EMBODIMENT

Cyclohexane (2.6 pounds) is introduced into a reactor such as that shown in the drawing along with 0.1 part of tetrahydrofuran per 100 parts total monomer. The solvent is then heated to initiation temperature of 142°F, and 169 grams of styrene are added. Thereafter 0.293 grams of n-butyllithium as a 1% solution of cyclohexane are added. Over a period of about 5 minutes the temperature reaches a peak of 210°F and a pressure at a maximum of about 30 psig. The styrene is allowed to react for 15 minutes at which time 56 grams of butadiene are charged and the reaction allowed to proceed for another 20 minutes. At this point 0.3 mols of methyltrimethoxy silane are added per mol of n-butyllithium. The effluent is withdrawn after 15 minutes and passed to a blowdown tank operated at about 180°F. and 4.0 cc of distilled water are added with carbon dioxide being purged in through the bottom. After 10 minutes mixing, the effluent is withdrawn, heated to about 290°F and passes under about 75 psig pressure to a tank where sufficient solvent is flashed to give a 36 weight percent solids content. The polymer solution is passed to a devolatilizing extruder with steam being introduced into the polymer melt downstream to help strip the remaining cyclohexane from the polymer and the coupled polymer is recovered. The cyclohexane which is flashed from the flash tank and the cyclohexane which is flashed from the extruder are passed to a separation column where the methyl alcohol is taken off at the top and pure cyclohexane recovered from the bottom and recycled to the reactor.

While this invention has been described in detail for the purpose of illustration, it is not to be construed as limited thereby but is intended to cover all changes and modifications within the spirit and scope thereof.

We claim:

1. In a process for preparing a coupled copolymer of a monovinyl-substituted aromatic hydrocarbon monomer having 8–18 carbon atoms per molecule and a conjugated diene having 4–12 carbon atoms per molecule wherein said monovinyl-substituted aromatic hydrocarbon monomer is contacted with an organo-lithium initiator in cyclohexane solvent in a reaction zone and thereafter said conjugated diene is introduced and polymerization continued, the improvement comprising: thereafter adding a silane having at least two methoxy groups to form said coupled copolymer; thereafter contacting said coupled copolymer with water; thereafter separating methyl alcohol thus produced from said cyclohexane and recycling said cyclohexane to said reaction zone; and recovering said coupled copolymer.

2. A process according to claim 1 wherein said monovinyl-substituted aromatic hydrocarbon monomer is styrene and said conjugated diene is 1,3-butadiene.

3. A method according to claim 2 wherein said copolymer is contacted with carbon dioxide and said water to improve color and haze of the resulting polymer.

4. A method according to claim 3 wherein said recovered copolymer is passed to an extrusion devolatilization zone.

5. A method according to claim 3 wherein said methanol is separated from said cyclohexane by an azeotropic distillation.

6. A method according to claim 5 wherein said silane is methyltrimethoxy silane.

7. A method according to claim 1 wherein said silane is methyltrimethoxy silane.

* * * * *